Nov. 21, 1933.     L. W. THOMPSON     1,936,415
REGULATING SYSTEM
Filed May 7, 1932
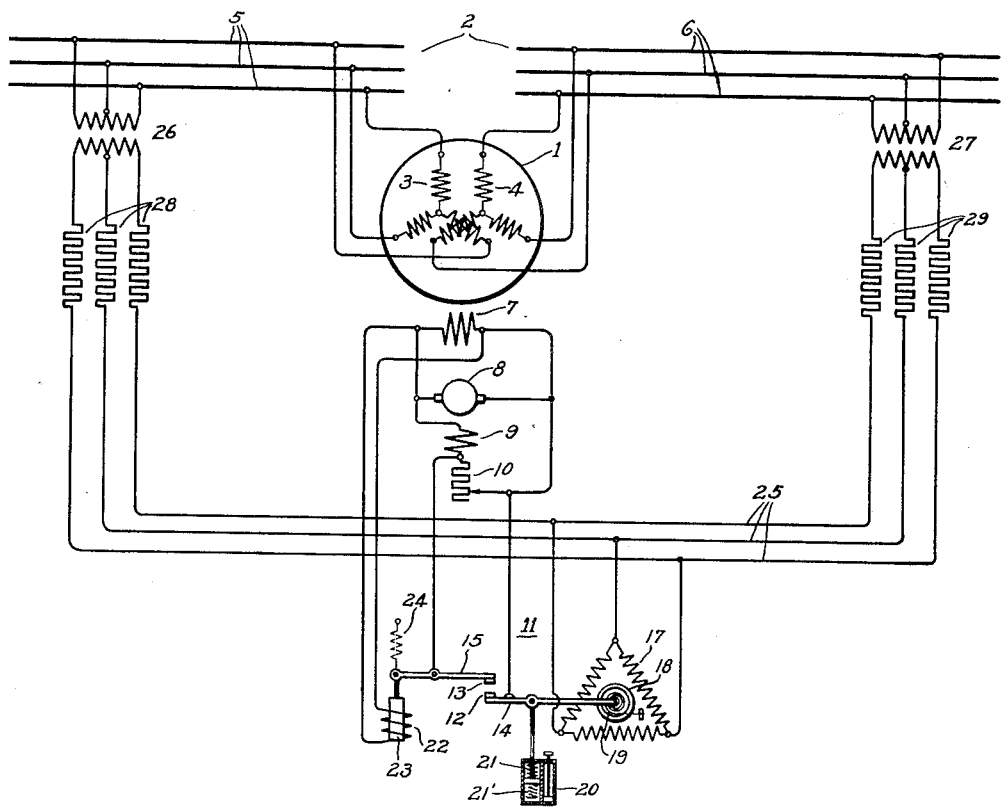
Inventor:
Louis W. Thompson,
by Charles E. Tullar
His Attorney.

Patented Nov. 21, 1933

1,936,415

UNITED STATES PATENT OFFICE 1,936,415

REGULATING SYSTEM

Louis W. Thompson, Schenectady, N. Y., assignor to General Electric Company, a corporation of New York Application May 7, 1932. Serial No. 609,909

10 Claims. (Cl. 171—119)

My invention relates to electrical regulating systems and more particularly to a single regulating means for controlling corresponding electrical characteristics of a plurality of electric circuits of power transmission systems.

In power transmission systems employing multiple winding generators provided with two or more separately insulated windings normally connected to supply energy to different bus sections, studies have disclosed the fact that maintaining corresponding electrical characteristics of the separate windings of a multiple winding generator as near as possible to a predetermined normal value plays an important part in the problem of system stability. For this reason it is desirable to obtain for any new condition in the system the desired change in excitation which will prevent an electrical characteristic of any winding of the generator deviating excessively from the predetermined normal value to cause instability of the system.

In the operation of multiple-winding synchronous generators in a power transmission system, difficulties have been experienced in regulating the excitation of a generator in accordance with an electrical characteristic of one winding alone, because the corresponding electrical characteristics of the other windings of the generator may deviate considerably from a predetermined normal value. For example, a substantial increase in excitation, due to a decrease in voltage of the winding which is regulated, may cause the voltages of the other windings of the generator to rise to high values, and thereby tend to bring about instability of the system. In power transmission systems employing a plurality of single winding generators each connected to supply energy to a different bus section of a sectionalized main bus, it is sometimes necessary to utilize a common excitation circuit and a single regulator or regulating system. In such cases the same difficulties of operation arise as recited in connection with double winding generators when an attempt is made to utilize a single regulator for all the generators operating in response to an electrical characteristic of a single bus section.

It is an object of my invention to provide an improved regulating system for dynamo-electric machines of power transmission systems for improving stability of operation.

Another object of my invention is to provide an improved regulating system for a plurality of electric circuits, such as a plurality of generating circuits, whereby the value of an electrical characteristic of each electric circuit is dependent upon the value of the corresponding electrical characteristics of the other electric circuits.

A further object of my invention is to provide an improved regulating system for a plurality of electric circuits, such as the separately insulated windings of multiple-winding dynamo-electric machines, whereby corresponding electrical characteristics of the electric circuits are controlled in such manner that the average value of the electrical characteristics of the electric circuits is maintained at a substantially predetermined normal value.

The novel features which I believe to be characteristic of my invention are set forth in the appended claims. The invention itself, however, both as to organization and method of operation, together with further objects and advantages thereof, will best be understood by reference to the following description taken in connection with the accompanying drawing in which the single figure is a diagrammatic representation of a regulating system embodying my invention.

Referring to the drawing, which is a diagrammatic representation of a power transmission system wherein my invention has been embodied, 1 indicates a three phase multiple-winding synchronous generator having a plurality of separately insulated armature circuits connected to energize a sectionalized main bus 2 in such a manner that each separately insulated circuit of the same generator energizes a different bus section. In this instance power transfer along the bus is obtained by means of the reactance provided by the generator through the coupling effect of the windings, although it may sometimes be desirable to utilize bus sectionalizing reactors. The alternating current generator is diagrammatically illustrated as a double winding generator although it will occur to those skilled in the art that arrangements may be provided for a generator having more than two windings without departing from my invention in its broader aspects. As shown, generator 1 comprises two separately insulated stator windings 3 and 4 which are connected to separate bus sections 5 and 6 of the main bus 2, and a field winding 7 preferably energized by an exciting dynamo-electric machine 8 provided with a shunt field winding 9. The excitation of the generator 1 is varied by any suitable regulating means, shown as an adjustable regulating resistor 10 connected in series with the field winding 9 and arranged to be varied by some form of automatic regulator.

In the illustrated embodiment I have shown a regulator 11 of the vibratory type and of the general form described and claimed in United States Letters Patent 1,743,798, granted January 14, 1930, on the application of Robert H. Park. It is to be understood, however, that other types of vibratory regulators, and also other types of regulators may be employed in accordance with my invention to vary the excitation of a multiple-winding dynamo-electric machine in a manner to maintain the average value of corresponding electrical characteristics of the windings of the machine at a predetermined normal value under various operating conditions.

Regulator 11, in the form shown, comprises two main contacts 12 and 13 mounted on pivoted contact arms 14 and 15, respectively. The contact arm 14 is actuated by a dynamo-electric device which comprises a stationary polyphase primary or inducing winding 17 for producing a rotating magnetic field and a rotatable closed circuit secondary or induced member 18. The winding 17 is connected to be energized from all the phases of the windings 3 and 4 of the multiple-winding generator. The rotatable member 18 is mechanically connected to actuate contact arm 14 and forms a pivot for this arm. The torque of the rotatable member, under predetermined normal conditions in the regulated circuits, is counterbalanced by a torque spring 19. In its preferred form the the dynamo-electric device is essentially an induction motor operating as a torque motor. In order to obtain a quick initial movement of the contact arm 14 followed by a damping action, the contact arm 14 is connected to suitable damping means such as a dashpot 20 through a resilient connection shown as springs 21 and 21'.

The pivoted contact arm 15 is actuated by an electromagnetic means comprising a solenoid 22 and a plunger 23 which is mechanically connected to the arm at a point removed from the contact end. The solenoid 22 is arranged to be energized in accordance with an electrical characteristic of the multiple-winding generator field circuit and as shown is connected to be responsive to the voltage of the field winding 7. A spring 24 is connected to the arm 15 at the solenoid end and is arranged to oppose the operation of the solenoid 22. Contacts 12 and 13 are shown connected across the resistor 10 for shunting the resistor as voltage conditions may require. In practice, the contacts of the regulator will usually be arranged to control the effective value of the resistor 10 through a relay, but for simplicity such relay has not been illustrated.

In accordance with my invention coresponding electrical characteristics of windings 3 and 4 of the double winding generator are made dependent upon each other by making the regulator responsive to the average value of said characteristic. In the illustrated embodiment of my invention the electrical characteristics are the voltages of the windings. Accordingly the winding 17 of the regulator is connected to each of the bus sections 5 and 6 through separate equal impedances so that with different voltages on the bus sections 5 and 6, the voltage drops in the respective impedance devices are of such value that the regulator is responsive to the average voltage of the windings 3 and 4. Although I prefer to make the regulator responsive to the average voltage of the windings 3 and 4, it may sometimes be desirable to adjust the impedance devices so that the regulator will be responsive to an intermediate voltage of the windings 3 and 4 other than the average voltage thereof. The winding 17 is connected to all the phases of a circuit 25, which is energized from the secondary windings of transformers 26 and 27 through impedance devices preferably having a high component of resistance and shown as resistors 28 and 29. The primary windings of transformers 26 and 27 are so connected to bus sections 5 and 6, respectively, that their secondary voltages are in phase opposition with respect to circuit 25. Winding 17 is connected to circuit 25 between resistors 28 and 29.

I prefer to employ resistors 28 and 29 of relatively high value, and to make the resistance of winding 17 of relatively low value. The high resistance of the resistors insures effective frequency compensation in the closed circuit 25. Furthermore, by making the resistance of winding 17 small and the resistors relatively large, the voltage heating error of winding 17 is reduced to a low value.

The operation of the arrangement shown in the drawing is substantially as follows: First assume that contact 12 is in a fixed position, and that generator 1 and exciter 8 are in operation. If the pull of solenoid 22 is insufficient to overcome the pull of spring 24, due to the exciter voltage, contact 13 will engage contact 12 and short circuit resistor 10 to permit the voltage of exciter 8 and current through field winding 7 to increase. As the voltage of exciter 8 increases and the alternating voltage of circuit 25 approaches the value to be maintained, contacts 12 and 13 will be separated. This inserts resistor 10 in the exciter field circuit and the exciter voltage starts to fall. When it has decreased to a certain value, the spring 24 will again close the contacts 12 and 13. Thus for a fixed position of arm 14 and contact 12, the exciter voltage will vary between two values and a certain average value will be obtained.

The average exciter voltage thus held will maintain a certain voltage of circuit 25. If this exciter voltage is of the proper value to cause the torque of rotor 18 to balance the opposing torque of spring 19, contact 12 will stay in the assumed position and the operation will continue in the manner hereinbefore described. Under balanced voltage conditions in bus sections 5 and 6, currents are induced to flow in the rotor 18 by the revolving magnetic field produced by the polyphase currents in the primary winding 17. These induced currents react on the magnetic field to produce a torque of the rotor 18 which is delivered to the contact arm 14, and which is balanced by the spring 19 when the voltage of circuit 25 is at a predetermined normal value. This predetermined normal voltage of circuit 25 is the average of the voltages at the terminals of the windings 3 and 4 of the generator 1. If the voltage of circuit 25 decreases, the torque of rotor 18 will be less than the counterbalancing torque of spring 19 and the contact arm 14 will move closer to contact 13 and increase the period during which the resistor 10 is short circuited. If the voltage of circuit 25 increases, the torque of rotor 18 will be greater than the counterbalancing torque of spring 19, and the contact arm 14 will move away from contact 13 and decrease the period during which resistor 10 is short circuited.

Under unbalanced voltage conditions in either bus section 5 or 6, or in both bus sections, the phase voltage or line-to-line voltage of the torque motor will contain symmetrical, positive and negative phase sequence components and the torque of the motor will be proportional to the difference between the squares of the magnitudes of the positive phase sequence components and negative phase sequence components. This insures that the regulator will tend to increase the generator excitation upon the occurrence of a single phase short circuit or upon the addition of a heavy single phase load.

During normal operating conditions, with the voltages of bus sections 5 and 6 at a predetermined normal value, the voltage drops across the resistors 28 and 29 are the same, and half of the current of winding 17 is supplied from bus section 5 through transformer 26, and the other half of the current of winding 17 is supplied from bus section 6 through transformer 27. If the voltage of bus section 6 increases to a value above that of normal, and the voltage of bus section 5 remains at the normal value, the voltage drops across the resistors 28 and 29 will be such that the voltage across the terminals of winding 17 will be directly proportional to the average of the voltages of bus sections 5 and 6, and the greater portion of the current of winding 17 will be supplied from bus section 6 through transformer 27. Since the resistors 28 and 29 are of comparatively high value, circulating currents are substantially eliminated in circuit 25, and all of the current flow will be through the winding 17 of the regulator. The regulator 11, which is responsive to this average voltage of circuit 25, will then operate to reduce the voltage of circuit 25 to the predetermined normal value. This reduces the voltages of bus sections 5 and 6, so that the average voltage of the bus sections will be at the predetermined normal value. In this manner, with one regulating system jointly responsive to the voltages of both bus sections 5 and 6, the deviation of voltage of either generator winding from the normal predetermined value is reduced to a minimum. If the voltage of bus section 6 increases to 160 per cent of normal value, for example, and the voltage of bus section 5 remains at the normal value, the voltage of circuit 25 will be 130 per cent of normal value. The regulator will then operate to reduce the voltage of circuit 25 to the predetermined normal value, and thereby reduce the voltage of bus section 6 to 130 per cent of normal value and the voltage of bus section 5 to 70 per cent of normal value. If the voltage of bus section 6 decreases to 30 per cent of normal value and the voltage of bus section 5 remains at the normal value, the voltage of circuit 25 will be 65 per cent of normal value. The regulator will then operate to increase the voltage of circuit 25 to the predetermined normal value, and thereby increase the voltage of bus section 6 to 65 per cent of normal value and the voltage of bus section 5 to 135 per cent of normal value. Thus, in the examples given, the voltage deviation of bus section 6 from the predetermined normal value is reduced from 60 to 30 per cent in the former case and from 70 to 35 per cent in the latter case. Since the voltage of bus section 5 is dependent upon the voltage of bus section 6, a corresponding change is made in the voltage of bus section 5 so that the average voltage of the bus sections is maintained at the predetermined normal value. In this manner the voltage of each winding of the generator is maintained as near as possible to the normal predetermined value so as to improve the operation of the generator when the voltages of the windings are unbalanced, and thereby increase the stability of the distribution system.

While I have shown and described a particular embodiment of my invention, it will be obvious to those skilled in the art that changes and modifications may be made without departing from my invention and I therefore aim in the appended claims to cover all such changes and modifications as fall within the true spirit and scope of my invention.

What I claim as new and desire to secure by Letters Patent of the United States is:

1. An electrical regulating system including a plurality of electric circuits, means for jointly controlling corresponding electrical characteristics of said circuits, and means operable in accordance with variations of an intermediate value of said corresponding electrical characteristics of said circuits for controlling said control means of said circuits.

2. An electrical regulating system including a plurality of electric circuits, means for jointly controlling corresponding electrical characteristics of said circuits, and means operable in accordance with variations of the average value of said corresponding electrical characteristics of said circuits for controlling said control means of said circuits to maintain the average value of the electrical characteristics of said circuits at a predetermined value.

3. In combination, a plurality of electric circuits, means for controlling corresponding electrical characteristics of said circuits, a plurality of impedance devices, and regulating means connected to each of said circuits through a different one of said impedance devices for controlling said control means of said first-mentioned circuits.

4. An electrical regulating system including a multiple-winding dynamo-electric machine having a plurality of separately insulated windings, an excitation circuit for said dynamo-electric machine, means for controlling said excitation circuit, and means operable in accordance with variations of an intermediate value of corresponding electrical characteristics of said windings for controlling said excitation circuit controlling means.

5. An electrical regulating system including a multiple-winding dynamo-electric machine having a plurality of separately insulated windings, an excitation circuit for said dynamo-electric machine, means for varying an electrical characteristic of said excitation circuit, and means operable in accordance with variations of the average value of the voltages of said windings for controlling said excitation circuit varying means to maintain the average value of said voltages at a predetermined value.

6. In combination, a multiple-winding synchronous alternating current machine having a plurality of separately insulated windings, an excitation circuit for said machine, means for controlling said excitation circuit, a circuit connected across said windings, said last mentioned circuit including impedance devices and regulating means connected across said last mentioned circuit between said impedance devices for controlling said excitation control means.

7. In combination, a multiple-winding synchronous alternating current machine having a plurality of separately insulated windings, an excitation circuit for said machine, means for controlling said excitation circuit, a plurality of equal resistors, and regulating means connected to each of said windings through a different one of said resistors for controlling said excitation control means.

8. In combination, a multiple-winding synchronous dynamo-electric machine having a plurality of separately insulated windings, an excitation circuit for said machine, means for controlling said excitation circuit, a plurality of impedance devices having a high component of resistance, and regulating means including a winding connected to each of said machine windings through a different one of said impedance devices for controlling said excitation control means, the resistance of said impedance devices being comparatively high compared with the resistance of said regulating means winding.

9. In a regulator system, a multiple-winding polyphase synchronous alterating current machine having a plurality of separately insulated windings, an excitation circuit for said machine, regulating means comprising cooperating contacts for controlling said excitation circuit, means responsive to an electrical characteristic of said excitation circuit for actuating one of said contacts, a polyphase dynamo-electric device for actuating the other of said contacts, and means for making said device responsive to an intermediate value of corresponding electrical characteristics of said windings.

10. In a power transmission system, a main distribution bus comprising a plurality of sections, a source of alternating current comprising a plurality of separately insulated generating circuits each connected to a different bus section, means for jointly controlling corresponding electrical characteristics of said generating circuits, a plurality of equal resistors, and regulating means connected to each of said sections through a different one of said resistors for controlling said control means of said generating circuits.

LOUIS W. THOMPSON.